Oct. 6, 1931.   C. B. THORNE   1,826,485
MEANS FOR SEPARATING PARTICLES FROM FREE WATER
Filed Oct. 11, 1928    3 Sheets-Sheet 2

INVENTOR.
C. B. Thorne,
BY E. J. Featherstonhaugh
ATTORNEY.

Oct. 6, 1931. C. B. THORNE 1,826,485
MEANS FOR SEPARATING PARTICLES FROM FREE WATER
Filed Oct. 11, 1928 3 Sheets-Sheet 3

INVENTOR
C. B. Thorne.
BY E. J. Featherstonhaugh
ATTORNEY.

Patented Oct. 6, 1931

1,826,485

UNITED STATES PATENT OFFICE

CARL BUSCH THORNE, OF HAWKESBURY, ONTARIO, CANADA

MEANS FOR SEPARATING PARTICLES FROM FREE WATER

Application filed October 11, 1928. Serial No. 311,838.

The invention relates to means for separating particles from free water, as described in the present specification and illustrated in the accompanying drawings that form part of the same.

The invention consists essentially of the novel features of construction pointed out broadly and specifically in the claims for novelty following a description containing an explanation in detail of an acceptable form of the invention.

The objects of the invention are to increase the output of machines for recovering pulp particles from white water; to reduce the cost of maintenance and facilitate the replacement and repair of parts; to present the screens to the white water, so that rubbing and pressing actions are eliminated; to insure a large area of screen surface within a comparatively small space; to simplify the operation and machinery for separating particles held in suspension in liquid; and generally to provide an efficient and economical means for separating particles from water in a machine of few parts and constructed at a low cost.

In the drawings, Figure 1 is a longitudinal sectional view of the machine.

Like numerals of reference indicate corresponding parts in the various figures.

Figure 1:
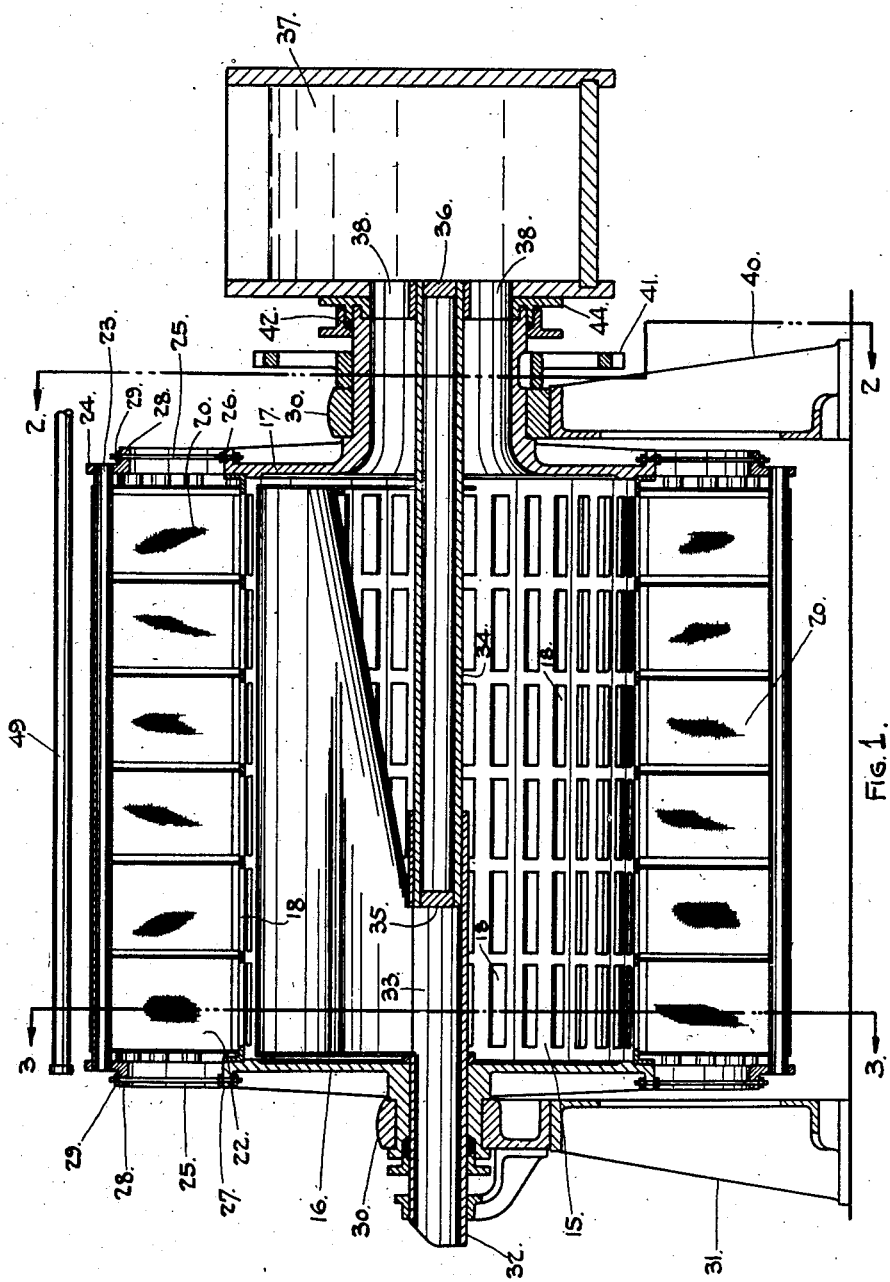
Figure 2:
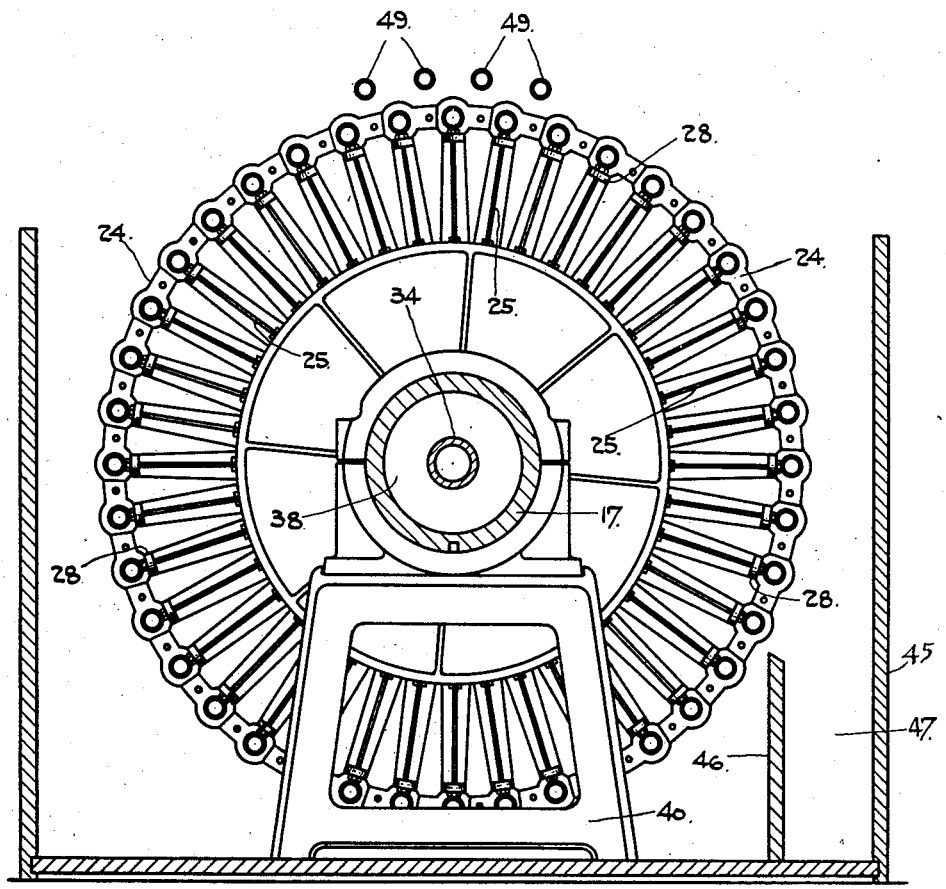
Figure 2 is a cross sectional view on the line 2—2 in Figure 1.
Figure 3:
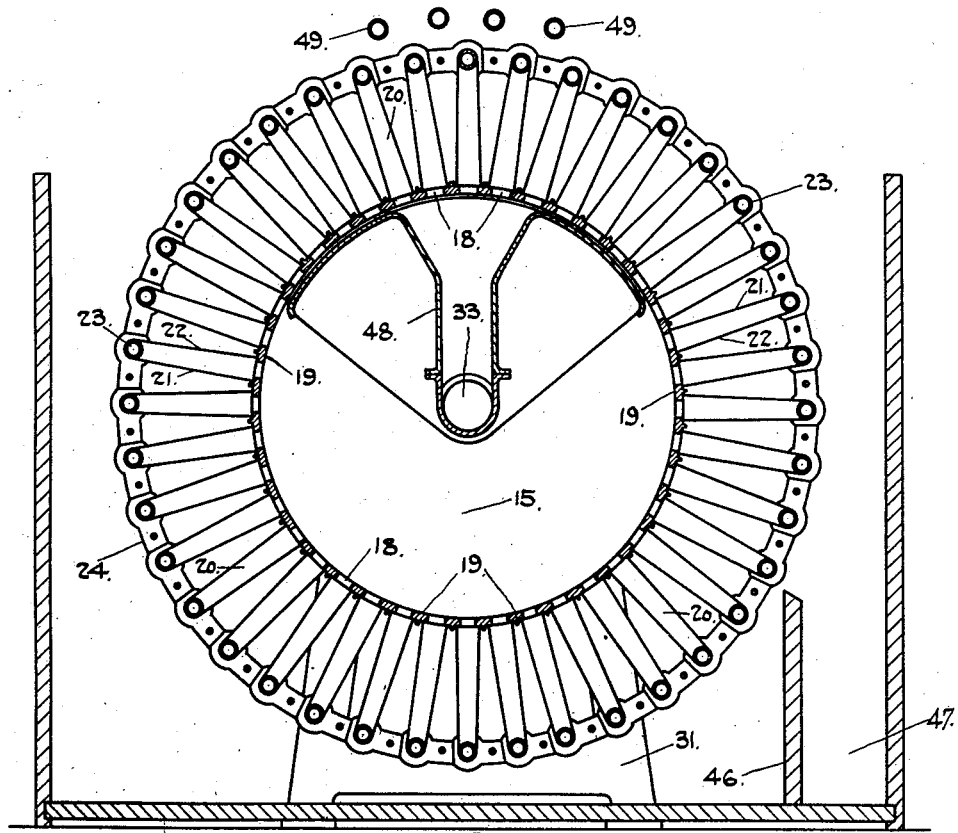
Figure 3 is a cross sectional view on the line 3—3 in Figure 1.

Referring to the drawings, the cylindrical cage indicated by the numeral 15 is fixedly secured to the hubs 16 and 17 and the slots 18 forming the cage apertures are spaced by the longitudinal ribs 19.

The screens 20 slightly tapered in form bridge the slots 18 between the ribs 19 and are made of wire mesh walls 21 and 22 spaced by the pipes 23 which are held in the ring frame 24. The pipes 23 and ring frame 24 are rigidly secured to the hubs 16 and 17 by the bolts 25 extending through the hub flanges 26 and 27 respectively and secured to the flanges 28 mounted on the pipes 23 by the nuts 29.

The hub 16 is journalled in the bearing 30 supported by the standard 31 and the discharge pipe 32 extends outwardly through said hub 16 from the cage 15 having the entrance 33 for the separated particles, this pipe 32 being further supported by the pipe 34 plugged at both ends 35 and 36 and extending from the head box 37 centrally through the hub 17, thereby forming the annular inlet passage 38 from said head box to the interior of the cage 15. The hub 17 is journalled in the bearings 39 supported by the standard 40 and carries in one form of drive the gear wheel 41, which may be connected by any suitable gear mechanism to the power. The packing 42 is applied around the hub 17 where it extends into the coupling 44.

The standards or pedestals carrying the machine stand in a box or trough 45, which forms the sewer passage and within this trough 45 a partition 46 extends upwardly from the bottom towards one side to catch the first white water in a side channel 47 from the rotating screens.

The stationary inclined trough 48 is supported by the plugged pipe 34 to bring it under the topmost screens and this trough 48 empties into the entrance 33 of the discharge pipe 32.

The spray pipes 49 are suitably supported above the rotary screen and are adapted to direct sprays of water between the screens as they pass in order that the collected particles on the inside of the wire meshes may be carried into the trough 48 and from there into the discharge pipe 32 and thus recovered from the white water.

Figure 4:
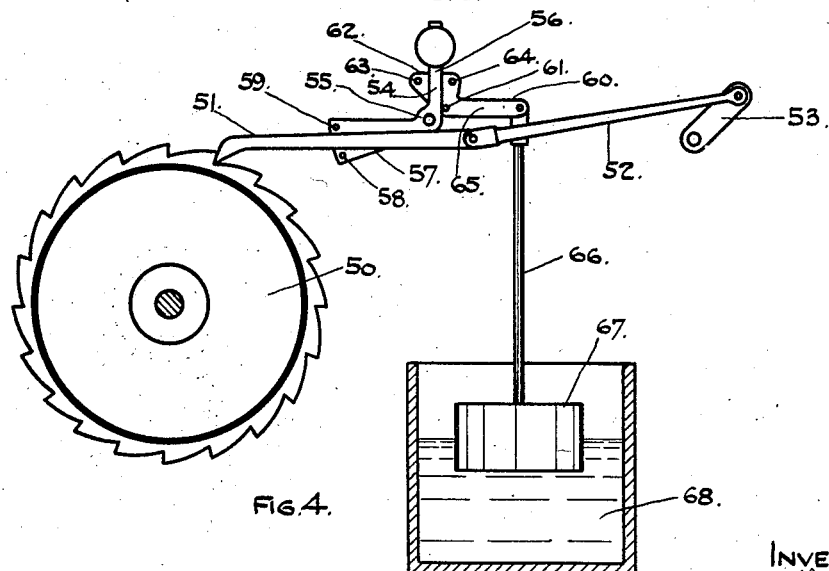
Figure 4 is a detail of a form of drive particularly applicable to this machine.

In Figure 4 a very effective form of driving mechanism is illustrated to be substituted under some conditions for the direct gear drive.

In this a ratchet wheel, indicated by the numeral 50 replaces the gear wheel 41 and is engaged by the pawl 51 pivotally secured to the connecting rod 52, extending from the crank 53, which is suitably driven and which in turn imparts an intermittent movement to the rotary screen member.

The central mechanism supports and operates the pawl 51 in so far as its engagement with the ratchet wheel is concerned.

The crank lever 54 is pivotally secured at its angle 55 and is formed of the weighted vertical arm 56 and the horizontal start and stop arm 57 having the pins 58 and 59 between which the pawl 51 operates.

The crank lever 60 is pivoted at its angle 61 and having the start and stop arm 62 with the pins 63 and 64 between which the arm 56 operates and a lever arm 65 pivotally connected to the stem 66 from the float 67 operating in the head box 68, so that when the screens become plugged with pulp, the water cannot flow through the screens and so it backs up and raises the level in the head box and the float raises and turns the crank lever 60 which brings the pin 64 against the arm 56 and throws the weighted arm over and brings the pin 59 against the pawl 51 thereby rotating the screens intermittently. When the screen has been sufficiently cleaned the water again flows freely through the wire and the float drops and brings the pin 63 against the arm 56 and throws it over thus brings the pin 58 into lifting contact with the pawl 51 thereby stopping the rotation of the rotary screen.

In the operation of this invention the white water flows from the head box into the cage 15 and through the opening of the said cage into the several screens. The cleaned screens beyond the sprays in the direction of rotation naturally pass the white water quickly, consequently this water is not properly separated from its particles and is therefore carried into the channel 47, from which it is directed to the supply of white water to be treated.

The passage of this white water through the many screens in their clean condition slightly clogs the interstices with the result that this coating forms a clinging surface for the remaining periods of the revolutions, until the screen interstices are well clogged. The screens in rotation reach the spray members and are cleared of the particles and flow into the discharge as already explained.

The intermittent operation of the rotary screen member may be considered as very efficient, as it insures a rest period which is usually considered important in obtaining the best results.

The water passing through the screens falls into the sewer passage and flows away as waste and is practically clear water of course, this does not do so, until the screens are in condition to stop most if not all of the fiber in the water.

It must be understood that with slight changes the course of the white water or other liquid treated may be changed, so as to coat the outside of the screens and naturally various other changes may be made from time to time following the continued use and the suggestion that would naturally occur therefrom.

What I claim is:—

1. In means for separating particles from free water, a trough forming a sewer passage and a division in said trough separating a recovered water passage, shaft bearings supported on pedestals, a rotary screen having screen boxes communicating with a hollow centre having heads carried by hubs, journalled in said bearings, a head box adapted to contain the feed water and having a hollow shaft extending therefrom through a hub into said centre and plugged at both ends and forming a support, a hollow shaft through the other hub supported from the aforesaid hollow shaft and having an ingress opening within said centre and a fixed trough communicating with said ingress opening.

2. In means for separating particles from free water, a rotatory cage having bars forming discharge apertures, a stationary trough within said cage having a central discharge and an annular feed opening clear of said discharge, radial screen chambers secured to the cage and extending outwardly therefrom and registering with the apertures thereof, and riding directly over said trough, a shaft journalled in suitable bearings and forming said central discharge and carrying said cage, a liquid receptacle containing said cage, bearings and trough and spray members above said trough for spraying said screen members.

3. In means for separating particles from free water, a cylindrical rotor having transverse openings in annular succession, and radially projecting box sieves covering said openings, a shaft carrying said rotor and journalled in suitable bearings and towards one end forming a discharge passage, a stationary discharge trough for the particles situated above the centre of said rotor and emptying through said shaft passage, a feed box communicating with said cylindrical rotor through an annular opening around said shaft, a receptacle containing said rotor and bearings and having a passage for reclaimable water falling from said sieves.

4. A separating screen comprising a cylindrical rotary member having transverse openings in annular succession capped by spaced wire meshes closed in to form sieve boxes extending outwardly and radially and throwing the water outwardly, the interior of said member forming a feed chamber to said sieve boxes, a stationary division in trough shape forming an outlet for the separated solids and situated in said interior above the center, a spray equipment above the cylindrical rotary member cleaning the sieve boxes in passage and effecting the discharge of the solids into said trough, and a reclaiming receptacle catching first discharge water following the cleaning of the sieve boxes, a reinforcing frame encircling said rotary member rigid with said boxes, a trough within the cylindrical rotary member and under said boxes on reaching their upper position, a group of spray pipes directed to upper boxes and a reclaiming division for the falling water passing through the sieve walls following the cleaning operation.

5. In means for separating particles from free water, a receptacle forming a passage and having a division forming a separate passage for the recovery of water in the first separating operations, a rotary structure suitably driven and carrying box sieves projecting outwardly in separate units from a center, a drum having perforations communicating with said sieves and forming said center and having therewithin a fed liquid chamber emptying into said screen boxes, and journalled in said receptacle and a stationary trough discharging through the bearings, and a tubular feed member connected with the source of supply and extending into said drum.

6. A separating device comprising a rotor suitably mounted and driven and having a drum shaped center with outlet apertures in the wall and feed and discharge openings in the heads respectively, screens secured over said outlet apertures and adapted to throw water outwardly, a recovery water passage receiving the first outward discharge of water following the completion of a revolution and a stationary solid discharge trough situated within the drum center and connected to the discharge opening through the head.

7. In means for separating particles from free water, a receptacle having bearings in the walls thereof and forming passages for waste and recovery water, a rotary structure journalled in said bearings and having a feed water chamber in the center thereof and tapering screen boxes secured to and projecting outwardly from said feed chamber and forming individual outlets to said recovery and waste divisions, a stationary receptacle within the feed chamber having a central spout discharge from the center of the rotary structure and a deflecting division directing the first discharge water into the recovery passage.

Signed at Montreal, Canada, this 23rd day of August, 1928.

CARL BUSCH THORNE.